United States Patent [19]

Himmelman, deceased et al.

[11] 4,008,878
[45] Feb. 22, 1977

[54] GAS CONTROL VALVE FOR GAS SHIELDED ELECTRIC WELDING TORCHES

[76] Inventors: Louis F. Himmelman, deceased, late of Upper Saddle River, N.J.; William F. Himmelman, executor, 28 Arrowhead Drive, Upper Saddle River, N.J.

[22] Filed: July 8, 1974

[21] Appl. No.: 486,701

Related U.S. Application Data

[63] Continuation of Ser. No. 218,303, Jan. 17, 1972, abandoned.

[52] U.S. Cl. .............................. 251/257; 251/319; 137/DIG. 2; 137/533.11
[51] Int. Cl.² ..................... F16K 15/18; F16K 1/14
[58] Field of Search .......... 251/251, 257, 318, 319, 251/258, 262, 263; 137/DIG. 2, 533.11

[56] References Cited

UNITED STATES PATENTS

| | | | |
|---|---|---|---|
| 799,203 | 9/1905 | Swinny | 137/DIG. 2 |
| 992,375 | 5/1911 | Moffitt | 251/229 |
| 1,593,122 | 7/1926 | Hallstead | 251/257 X |
| 2,027,458 | 1/1936 | Tepaj | 251/257 X |
| 2,387,007 | 10/1945 | Buchanan | 251/258 X |
| 2,869,582 | 1/1959 | Skipwith, Jr. | 251/257 X |
| 2,879,790 | 3/1959 | Ey | 251/263 X |
| 3,516,639 | 6/1970 | Himmelman | 251/257 |

*Primary Examiner*—Arnold Rosenthal
*Attorney, Agent, or Firm*—James J. Cannon, Jr.; James J. Cannon

[57] ABSTRACT

An axially shiftable gas control and shut-off valve utilizing a spherical ball check seatable in a frusto-conical valve seat formed along a gas flow path in a valve body member, and a valve stem extending transversely through the body member across the flow path and axially shiftable with respect thereto along an axis perpendicular to the axis of symmetry of the valve seat. The valve stem has a concentrically-arranged, frusto-conical cam portion operative, when the valve stem member is shifted between one position and another, to move the ball check between seated and unseated positions with respect to the valve seat to control gas flow.

1 Claim, 4 Drawing Figures

U.S. Patent  Feb. 22, 1977  4,008,878
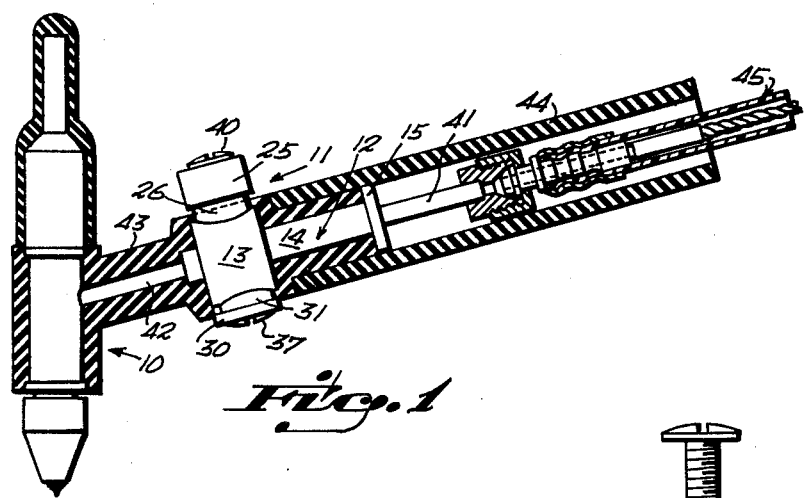
Fig. 1
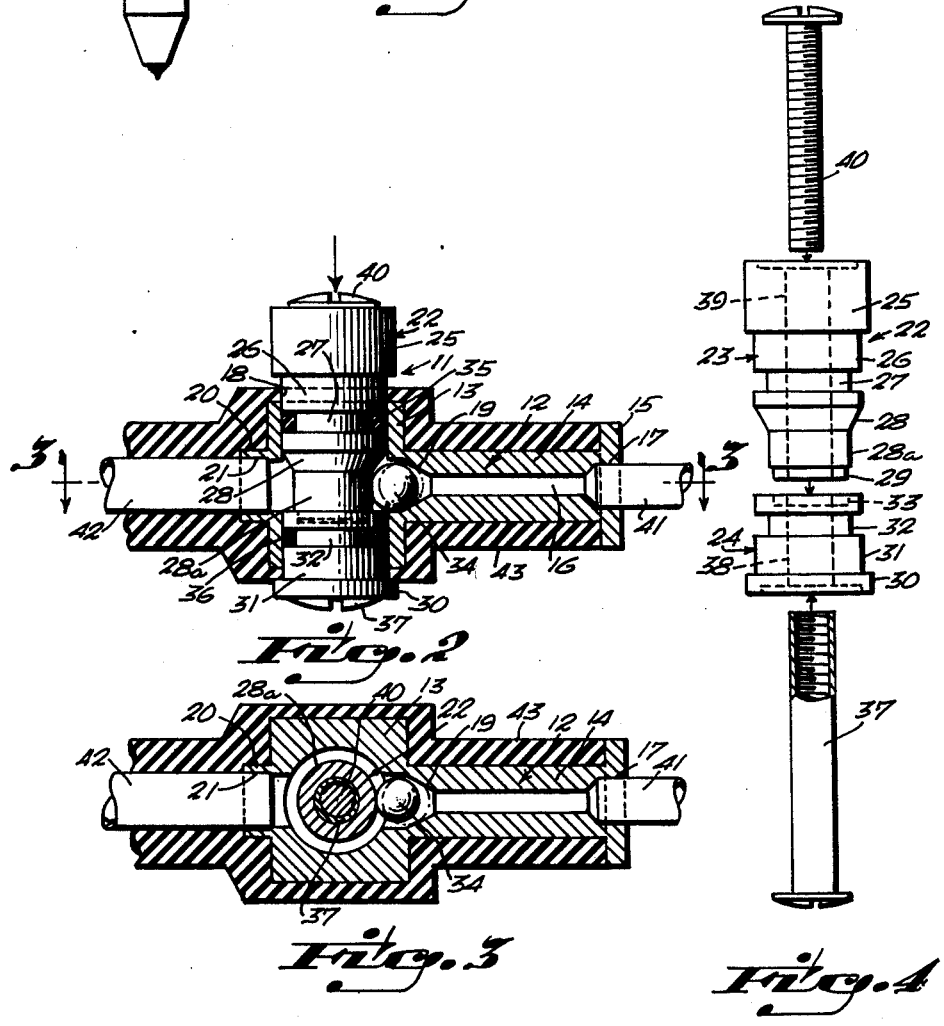
Fig. 2
Fig. 3
Fig. 4

GAS CONTROL VALVE FOR GAS SHIELDED ELECTRIC WELDING TORCHES

This is a continuation of application Ser. No. 218,303, filed Jan. 17, 1972, now abandoned.

This invention relates to gas shielded electric welding torches of the type described in my U.S. Pat. No. 3,516,639 titled Gas Cooled and Gas Shielded Electric Welding Torch. The present invention is directed to improvements in the valve mechanism for controlling the flow of inert gas fed under pressure to such torches to provide an inert gaseous atmosphere surrounding the arc flame during welding. In the improved torch described in my above-mentioned patent, the flow controlled gas is used as a coolant for cooling the torch in addition to being used as an inert gaseous arc tip shroud.

The gas control valve of the present invention is simpler in construction and operation than gas valves heretofore used in electric arc torches, being comprised simply of a ball check adapted to seat in a frusto-conical valve seat in the gas flow path, an axially shiftable valve stem having a frusto-conical cam portion operative, when shifted for the control of gas flow, to move the ball into sealing engagement with its valve seat. This simplicity results not only in a less expensive valve, but also in a valve that can readily be operated by one finger instead of both thumb and forefinger. It is, accordingly, the principal object of this invention to provide a novel and improved gas flow control valve especially adapted for use with electric welding torches, which will be inexpensive to manufacture, simple and compact in construction, easy to use, and dependable and long-wearing in operation.

Other objects, features and advantages will be apparent from the following description when read with reference to the accompanying drawings. In the drawings, wherein like reference numerals denote corresponding parts throughout the several views:

FIG. 1 illustrates, in side elevation and partly in section, an electric welding torch equipped with a gas control valve embodying the invention;

FIG. 2 is a fragmentary view of the torch assembly shown in FIG. 1, illustrating, on an enlarged scale and in vertical cross section, the gas control valve embodying the present invention;

FIG. 3 is a horizontal cross-sectional view taken along the line 3—3 of FIG. 2 in the direction of the arrows and illustrating constructional details of the gas control valve; and FIG. 4 is an "exploded" view of the valve stem and handle assemblage of the gas control valve, shown separately.

Referring now in detail to the drawings, reference numeral 10 designates, generally, an electric torch of the type described in my above-mentioned patent application, differing principally in being equipped with the improved gas control valve embodying the invention, indicated generally at 11. Referring now to FIGS. 2, 3 and 4, it will be seen that the gas control valve 11 of the present invention comprises a valve housing 12, which is preferably integrally formed of brass. The valve housing 12 comprises a rectangular body portion 13 extending from one side of which is a tubular gas inlet portion 14 the distal end of which is provided with an annular flange portion 15. The central through bore 16 of the tubular inlet portion 14 is counter-bored at its outer end, as indicated at 17, for the purpose hereinafter appearing. The rectangular body portion 13 of the valve housing 12 is formed with a comparatively large, transverse bore 18 which communicates with the central through bore 16 of the tubular inlet portion 14 through a frusto-conical passageway 19 at the inner end of said central bore, said frusto-conical passageway defining a valve seat, as is hereinbelow more particularly described. The rectangular body portion of the valve housing 12 is also formed with an outlet nipple 20 at the side opposite the tubular inlet portion 14 and providing a counter-bored through opening 21 coaxially aligned with the central through bore 16 of said tubular inlet portion.

The gas control valve also comprises a valve stem assembly 22 comprising an upper valve stem section 23 and a lower valve stem section 24. Preferably, the valve stem sections 23 and 24 are machined of "Fluorocarbon Resin" to resist heat. As best illustrated in FIG. 4, the upper valve stem section 23 is integrally formed with a cylindrical handle portion 25 extending into a reduced-diameter portion 26 provided with an annular groove 27 for the seating therein of a sealing O-ring as hereinafter described. The reduced-diameter portion 26 of the upper valve stem section 23 extends into a symmetrical, frusto-conical cam portion 28 which, in turn extends into a reduced-diameter cylindrical portion 28a terminating in a short, concentric, circular, tapered key portion 29.

The lower valve stem section 24 is integrally formed with a short, cylindrical outer end portion 30 extending into a comparatively long reduced-diameter portion 31 formed with an annular groove 32 for the reception therein of a second sealing O-ring, as hereinafter described. The outer end of the reduced-diameter portion 31 of the lower valve stem section 24 is formed with a concentric, tapered annular recess 33 adapted to receive, in complementary interfitting engagement upon assembly, the tapered key portion 29 of the upper valve stem section 23.

Referring now to assembly FIGS. 2 and 3, it will be seen that a spherical ball check 34 is disposed within the recess provided by the frusto-conical bore of valve seat 19, and that the upper and lower valve stem sections 23 and 24 are assembled together within the transverse bore of the rectangular body 13 so that the protruding portion of the ball check 34 is received within the recess within the transverse bore 18 defined by the cam surface of the frusto-conical portion 28 and the reduced-diameter portion 28a of the upper valve stem portion 23.

In assembly, the ball check 34 will first be placed in its valve seat 19, after which the upper valve stem section 23, fitted with an O-ring 35, will be inserted in place through the upper end of valve housing transverse bore 18. Next, the lower valve stem section 24, equipped with an O-ring 36, will be inserted through the lower end of the transverse bore 18 in inter-fitting engagement with the upper valve stem section 23, viz, with the tapered key portion 29 of the upper section snugly received within the complementary tapered recess 33 of the lower section. The assemblage is held together by means of an internally-threaded sleeve nut 37 received through co-axial bores 38 and 39 in the lower and upper valve stem sections 24, 23, respectively, retained by a machine screw 40 extending through the upper valve stem section 23.

As illustrated in FIGS. 1, 2 and 3, the counter-bored portion 17 of the tubular inlet portion 14 of the gas control valve is adapted to receive an inlet tube 41 forming part of the electric torch for the supply of gas thereto under pressure, and the counter-bore 21 of the outlet nipple 20 is adapted to receive a gas outlet conduit 42 for supplying flow-controlled gas to the torch, said tube and conduit being appropriately brazed or welded in place with respect to the valve housing. Preferably, the valve housing 12 is provided with an insulating jacket 43, which may be comprised of a material having a high dielectric strength as well as good heat insulating qualities, such as a phenolic material or bonded silicone rubber. The insulating jacket portion over the tubular inlet portion 14 has an outer diameter substantially the same as the outer diameter of the end flange 15, so as to receive in pressed-on interfitting engagement a tubular hand grip member 44 that can be removed without difficulty when necessary for disconnecting a gas and electrical current conduit assemblage 45 of the type described in detail in my above-mentioned patent application.

In operation, pushing inwardly upon the cylindrical handle portion 25 of the upper valve stem member 23, as indicated by the arrow in FIG. 2, will shift the valve stem assembly 22 downwardly within the transverse bore 18, whereupon the angular cam surface of the frusto-conical cam portion 28, coming into contact with the check ball 34, will cause said check ball to be moved from the unseated position, represented by the full-line position thereof in FIG. 2, to the seated position within its frusto-conical valve seat 19, as represented by the broken-line position thereof as illustrated in FIG. 2. When thus seated, it will be understood that the flow of gas from the gas inlet tube 41 will be shut off. In order to open the valve again, it is only necessary to push upwardly upon the sleeve nut 37 to shift the valve stem assembly 22 in its upward position, whereupon the ball check 34 will be free to move again into the recess in the transverse bore 18 defined by the frusto-conical cam portion 28 and reduced-diameter portion 28a of said valve stem assembly under the pressure of incoming gas. It will be understood that the above-described cam action controlling the position of the ball check 34 with respect to its valve seat 19 will be gradual enough to permit adjustment of gas flow volume to the desired rate.

It is to be noted that the cam action upon the ball check 34 by the valve stem cam portion 28 is so gradual that gas pressure on the inlet side will not cause reversal or self-opening of the valve. The gas sealing O-rings 35 and 36, moreover, which are preferably of a tough, heat-resistant material such as silicone rubber, also afford sufficient friction to prevent self-sliding of the valve stem assembly under normal operating conditions. It is further to be noted that the inter-fitting of the conical key portion 29 of the upper valve stem section 23 within the tapered recess 33 of the lower valve stem section 24 will be tight enough to prevent the leakage of gas as this juncture.

While I have illustrated and described herein only one form in which the invention can conveniently be embodied in practice, it is to be understood that this form is presented by way of example only and not in a limiting sense. The invention, in brief, comprises all the embodiments and modifications coming within the scope and spirit of the following claims.

What I claim as new and desire to secure by Letters Patent is:

1. A gas flow control valve for electric arc torches comprising:

a valve body member having substantially coaxial gas inlet and gas outlet passageways;

a bore in said valve body member transverse with respect to and communicating at opposite interior sides thereof with said gas inlet and said gas outlet passageways;

a frusto-conical passageway defining a valve seat recess at the inner end of said gas inlet passageway at the junction of said transverse bore;

a ball check valve member disposed in said valve seat recess;

a valve stem member slidably received within said transverse bore;

said valve stem member having a cam means comprising a frusto-conical cam surface portion coaxially formed along said valve stem member and defining a recess in said transverse bore within which said ball check is partially received;

said cam means operative upon axially shifting said valve stem member to move said ball check between unseated and seated positions with respect to said valve seat recess;

said valve stem member comprising a pair of transversely divided upper and lower valve stem sections, said upper section comprising said frusto-conical cam surface portion, and means for bolting said upper and lower valve stem sections together within said transverse bore;

said bolting means comprising a sleeve nut extending through axial bores in said upper and lower valve stem sections and a machine screw threaded in said sleeve nut;

means for securing said valve stem sections in end-to-end interfitting engagement comprising a short, tapered cylindrical key portion formed on one of said valve stem sections receivable in a complementary tapered circular recess in the other of said valve stem sections; and means for sealing said upper and lower valve stem sections comprising resilient O-rings seated within annular grooves provided in said upper and lower valve stem sections.

* * * * *